US009275032B2

(12) United States Patent
Campbell et al.

(10) Patent No.: US 9,275,032 B2
(45) Date of Patent: Mar. 1, 2016

(54) PRIVATE VIEWS OF DATA AND LOCAL CALCULATIONS DURING REAL TIME COLLABORATION

(75) Inventors: Johnny S. Campbell, Renton, WA (US); Joseph M. Chirilov, Redmond, WA (US); Michael H. Smith, Seattle, WA (US); Robert G. Hawking, Seattle, WA (US); Rishabh Tandon, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 852 days.

(21) Appl. No.: 13/459,845

(22) Filed: Apr. 30, 2012

(65) Prior Publication Data

US 2012/0216103 A1 Aug. 23, 2012

Related U.S. Application Data

(62) Division of application No. 11/924,051, filed on Oct. 25, 2007, now Pat. No. 8,190,987.

(51) Int. Cl.
*G06F 17/00* (2006.01)
*G06F 17/24* (2006.01)
*G06F 17/30* (2006.01)

(52) U.S. Cl.
CPC ........ *G06F 17/246* (2013.01); *G06F 17/30174* (2013.01); *G06F 17/30873* (2013.01)

(58) Field of Classification Search
CPC ............ G06F 17/246; G06F 17/30174; G06F 17/30873
USPC .......................... 715/212, 273, 733, 751, 753
See application file for complete search history.

(56) References Cited

U.S. PATENT DOCUMENTS 6,138,130 A 10/2000 Adler et al.
6,157,934 A 12/2000 Khan et al.
(Continued)

FOREIGN PATENT DOCUMENTS

JP 2005-018791 A 1/2005
JP 2009-508216 A 2/2009
(Continued)

OTHER PUBLICATIONS

Paul Goldwater and Lois S. Mahoney, "Collaborate on Spreadsheets", Jan. 1, 2004, Journal of Accountancy, pp. 6.*
(Continued)

*Primary Examiner* — Chau Nguyen
(74) *Attorney, Agent, or Firm* — Damon Rieth; Danielle Johnston-Holmes; Micky Minhas

(57) ABSTRACT

Techniques for performing a process during a real time collaboration by multiple users or clients on a spreadsheet file are disclosed herein which may permit calculations to be performed locally by at least one of the clients. By doing so, increases in performance are realized since only data updates need to be provided to the host machine. As such, a determination is preferably made whether calculations performed locally can result in different data. If conflicting data is a possibility, then the calculations for the spreadsheet file will usually be performed remotely by a host machine. If not, then each client capable of doing so will perform the calculations locally and then provide only the updated data to the host machine. The determination of whether to perform the calculations locally or not may also be made dynamically, such as when one or more new formulas are added to the spreadsheet file.

15 Claims, 4 Drawing Sheets

(56) References Cited

U.S. PATENT DOCUMENTS

| | | | |
|---|---|---|---|
| 6,233,600 B1* | 5/2001 | Salas | G06F 17/3089 |
| | | | 707/E17.116 |
| 6,342,906 B1 | 1/2002 | Kumar et al. | |
| 6,411,967 B1 | 6/2002 | Van Renesse | |
| 6,564,246 B1 | 5/2003 | Varma et al. | |
| 6,988,241 B1 | 1/2006 | Guttman et al. | |
| 7,047,484 B1 | 5/2006 | Becker et al. | |
| 7,082,569 B2 | 7/2006 | Voshell | |
| 7,213,199 B2 | 5/2007 | Humenansky et al. | |
| 7,233,951 B1 | 6/2007 | Gainer et al. | |
| 7,640,506 B2 | 12/2009 | Pratley et al. | |
| 7,647,551 B2 | 1/2010 | Vigesaa et al. | |
| 2002/0055953 A1 | 5/2002 | Tesch et al. | |
| 2002/0087632 A1* | 7/2002 | Keskar | H04L 67/306 |
| | | | 709/204 |
| 2002/0129054 A1 | 9/2002 | Ferguson et al. | |
| 2002/0188629 A1 | 12/2002 | Burfoot | |
| 2003/0018719 A1 | 1/2003 | Ruths et al. | |
| 2004/0172424 A1 | 9/2004 | Edelstein et al. | |
| 2004/0237045 A1 | 11/2004 | Meltzer | |
| 2005/0091206 A1 | 4/2005 | Koukerdjinian et al. | |
| 2005/0102364 A1 | 5/2005 | Ozzie et al. | |
| 2006/0212469 A1 | 9/2006 | Babanov et al. | |
| 2006/0248104 A1* | 11/2006 | Ahmad | G06F 9/466 |
| 2006/0248449 A1* | 11/2006 | Williams | G06F 9/4443 |
| | | | 715/209 |
| 2006/0248451 A1* | 11/2006 | Szyperski | G06F 8/00 |
| | | | 715/209 |
| 2007/0061698 A1* | 3/2007 | Megiddo et al. | 715/503 |
| 2007/0061699 A1 | 3/2007 | Battagin et al. | |
| 2007/0233811 A1* | 10/2007 | Rochelle et al. | 709/219 |
| 2008/0077631 A1* | 3/2008 | Petri | G06F 17/2205 |
| 2008/0140623 A1 | 6/2008 | Tien et al. | |
| 2008/0244442 A1* | 10/2008 | Veselova | G06F 9/4443 |
| | | | 715/781 |

FOREIGN PATENT DOCUMENTS

| | | |
|---|---|---|
| KR | 2000/0076508 | 12/2000 |
| KR | 2004/0077497 | 9/2004 |
| WO | WO 2009/055263 | 4/2009 |

OTHER PUBLICATIONS

"Good, Better, Best: Windows SharePoint Services Integration with Microsoft Office", White Paper, Jul. 2003, Microsoft SharePoint—Products and Technologies, pp. 12.*

Imine, "Component-based specification of collaborative objects", Electronic Notes in Theoretical Computer Science (ENTCS), Feb. 2007, 168, 175-190, Abstract Only.

Shiozawa et al., "Perspective layered visualization of collaborative workspaces", ACM, 1999, 71-80.

* cited by examiner

PRIVATE VIEWS OF DATA AND LOCAL CALCULATIONS DURING REAL TIME COLLABORATION

CROSS-REFERENCE TO RELATED APPLICATIONS

This application is a divisional of prior U.S. patent application Ser. No. 11/924,051, filed on Oct. 25, 2007, which is incorporated herein by reference in its entirety.

BACKGROUND

A new feature related to some spreadsheet applications is the ability for multiple users to collaborate on a single spreadsheet file simultaneously in real time. This is a mode of editing where each user can instantaneously (or almost instantaneously) see changes made by other users who are editing the file. For example, when a first user makes a change to a spreadsheet cell, all other users may have their view of the spreadsheet updated milliseconds later so that all changes seem to appear as they happen. There are often other features that go along with this type of collaboration such as real time chat and user presence information. If implemented well, this feature truly creates the appearance that users are working together on the same spreadsheet, sharing and editing data at the same time.

One problem associated with real time collaboration is that, in most scenarios, each collaborating user wants to see the same data in the spreadsheet file. This is a clear user expectation, and, if users don't see the same data after they make changes, they will feel like the data is incorrect, or that their changes weren't received properly. The users may also become uncertain as to who has the 'right' data. Since this user expectation is core to the user experience, calculations in conventional real time collaboration environments are performed at a central location such as a server and then broadcast to each client separately. This is because different calculations made at different times can cause the data to be different in many cases. Thus, every time a user makes a change, the change is broadcast, and the spreadsheet file is recalculated and rebroadcast so that every client version of the spreadsheet file can be updated. Doing this takes time, and is particularly slow for spreadsheets that have more complex calculations.

Another problem associated with real time collaboration is that collaborating users will often want to see their own unique view of the data. For example, when users are entering data into a single large table, each user may have entries that only the individual user cares about seeing. Each individual user may want to filter the table in a unique way so that only the entries that the individual user is responsible for are shown. The problem is that each user typically has a different filter to be applied to the same table, but, since each user is editing the same table at the same time, they all see each other's changes. This traditionally has made manipulating or analyzing data in a real time collaborative environment very difficult if not impossible.

SUMMARY

Techniques for performing a process during a real time collaboration by multiple users or clients on a spreadsheet file are disclosed herein which may permit calculations to be performed locally by at least one of the clients. By doing so, increases in performance are realized since only data updates need to be provided to the host machine. As such, a determination is preferably made whether calculations performed locally can result in different data. If conflicting data is a possibility, then the calculations for the spreadsheet file will usually be performed remotely by a host machine. If not, then each client capable of doing so will perform the calculations locally and then provide only the updated data to the host machine. The determination of whether to perform the calculations locally or not may also be made dynamically, such as when one or more new formulas are added to the spreadsheet file by one of the collaborating clients.

Techniques are also disclosed herein with respect to providing a desired view of the spreadsheet file by the clients collaborating thereon. Rather than displaying the typical shared view, which includes all the details of the spreadsheet file, a private view may be displayed for each client according to the data such client chooses. This may be the result from the use of a sort, filter or other tool, for example. Accordingly, only certain specified operations may be synchronized between a client computer and a host machine, but all data will be provided so that it can be further sent to the other client computers. In order to allow the desired or private views of a client computer to be available after the collaboration, each such view may be persisted in the spreadsheet file of the host machine.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The illustrative embodiments will be better understood after reading the following detailed description with reference to the appended drawings, in which.

DETAILED DESCRIPTION

The inventive subject matter is described with specificity to meet statutory requirements. However, the description itself is not intended to limit the scope of this patent. Rather, it is contemplated that the claimed subject matter might also be embodied in other ways, to include different steps or combinations of steps similar to the ones described in this document, in conjunction with other present or future technologies.

Figure 1:
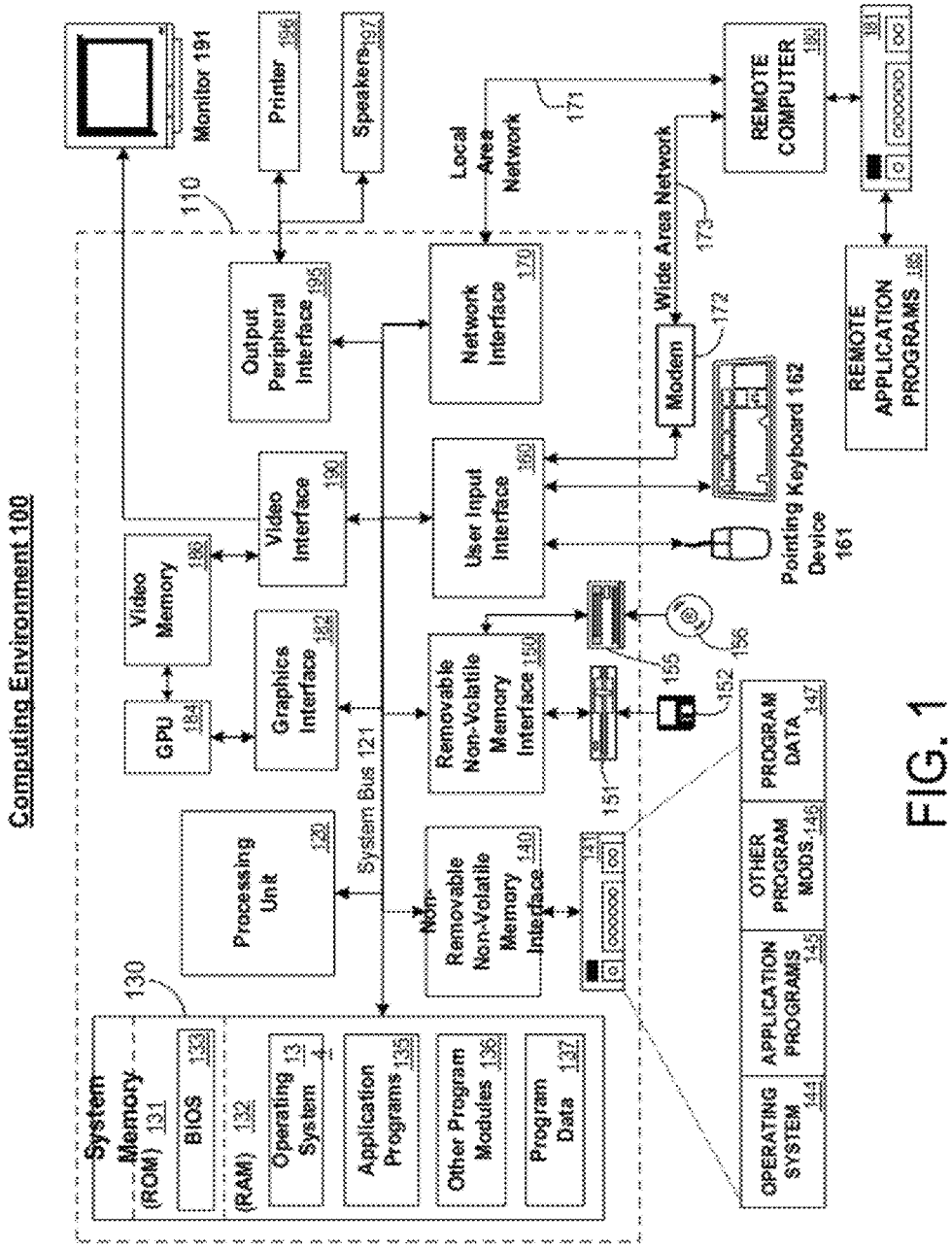
FIG. 1 is a block diagram an exemplary computing device.

FIG. 1 illustrates an example of a suitable computing system environment 100 in which the subject matter described above may be implemented. The computing system environment 100 is only one example of a suitable computing environment and is not intended to suggest any limitation as to the scope of use or functionality of the subject matter described above. Neither should the computing environment 100 be interpreted as having any dependency or requirement relating to any one or combination of components illustrated in the exemplary operating environment 100.

With reference to FIG. 1, computing system environment 100 includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181.

It will be appreciated that the network connections shown are exemplary and other means of establishing a communications link between the computers may be used.

Figure 2:
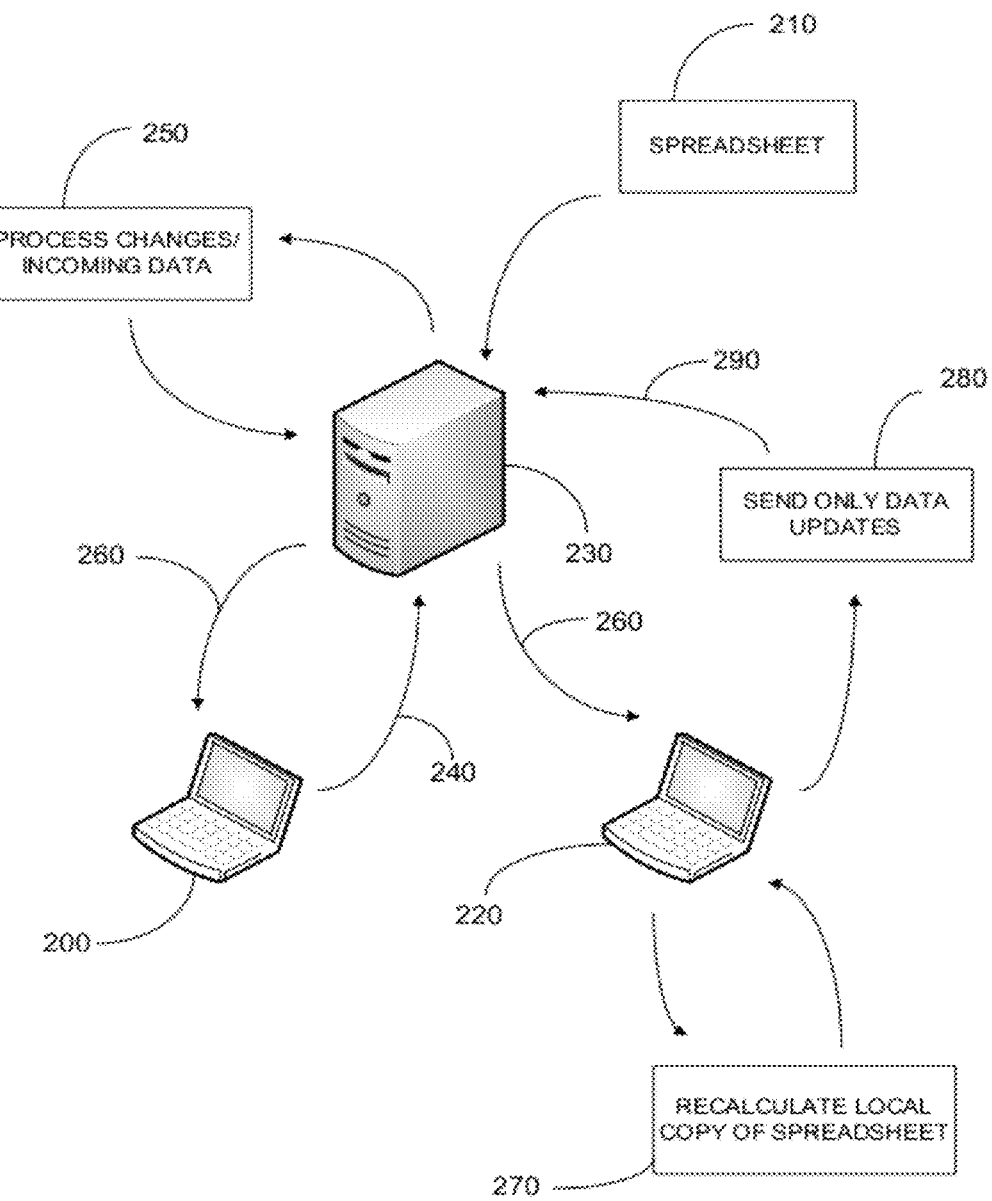
FIG. 2 is a system diagram depicting a plurality of client computers collaborating on a spreadsheet file, where one client computer is performing calculations locally.

It will be appreciated from FIG. 2 that two or more computing systems 200 and 220, such as like that described above, also known as a first client and a second client, respectively, may desire to collaborate in real time on a common file, such as a spreadsheet file 210. This is a mode of editing where each user or client may see changes made by any other users or clients who are editing the file at that time. As shown, this is accomplished via a separate host machine, such as a server 230, which contains the version of the spreadsheet file that will be saved. Of course, any of the client computers may be utilized as the host machine for the collaboration so long as it has the capability and the client computers are properly networked.

In the typical collaborative arrangement, the client computer (e.g., computing system 200) will pass messages or data updates (as depicted by arrow 240) via computer-executable instructions to the host machine 230. Host machine 230 then processes the various changes or incoming data received from all clients (depicted in box 250) and sends such updates (as depicted by arrows 260) via computer-executable instructions to each client computer. In this way, the state of spreadsheet file 210 for all client computers is kept in synch during the collaboration. It will be understood that changes made to the spreadsheet file 210 by any of the client computers may be provided to the other client computers very quickly so that all changes seem to appear as they happen.

Rather than rely upon host machine 230 to centrally perform all calculations performed in spreadsheet file 210 and then re-broadcast the results to the individual client computers, it is preferred in at least some circumstances that the calculations be performed locally (see box 270) by one or more client computers. In the example of FIG. 2, only client computer 220 is depicted as performing these local calculations, but it should be appreciated that any number of other client computers (e.g., client computer 200) may also perform these local calculations. The local calculations may be accomplished, for example, by what is known in the art as a thick client version or by using other logic (e.g., logic contained in a local web page). After such local calculations have been performed by the client computer 220, only updates to the data (see box 280) are then sent (as depicted by arrow 290) to the host machine 230 for synchronization. It will be appreciated that, during any collaborative session, one or more client computers may perform the calculations for spreadsheet file 210 locally and one or more client computers may rely upon host machine 230 to perform such calculations remotely. By performing calculations required by spreadsheet file 210 locally, however, data updates may be accomplished more quickly, particularly when complex calculations are involved.

Figure 3:
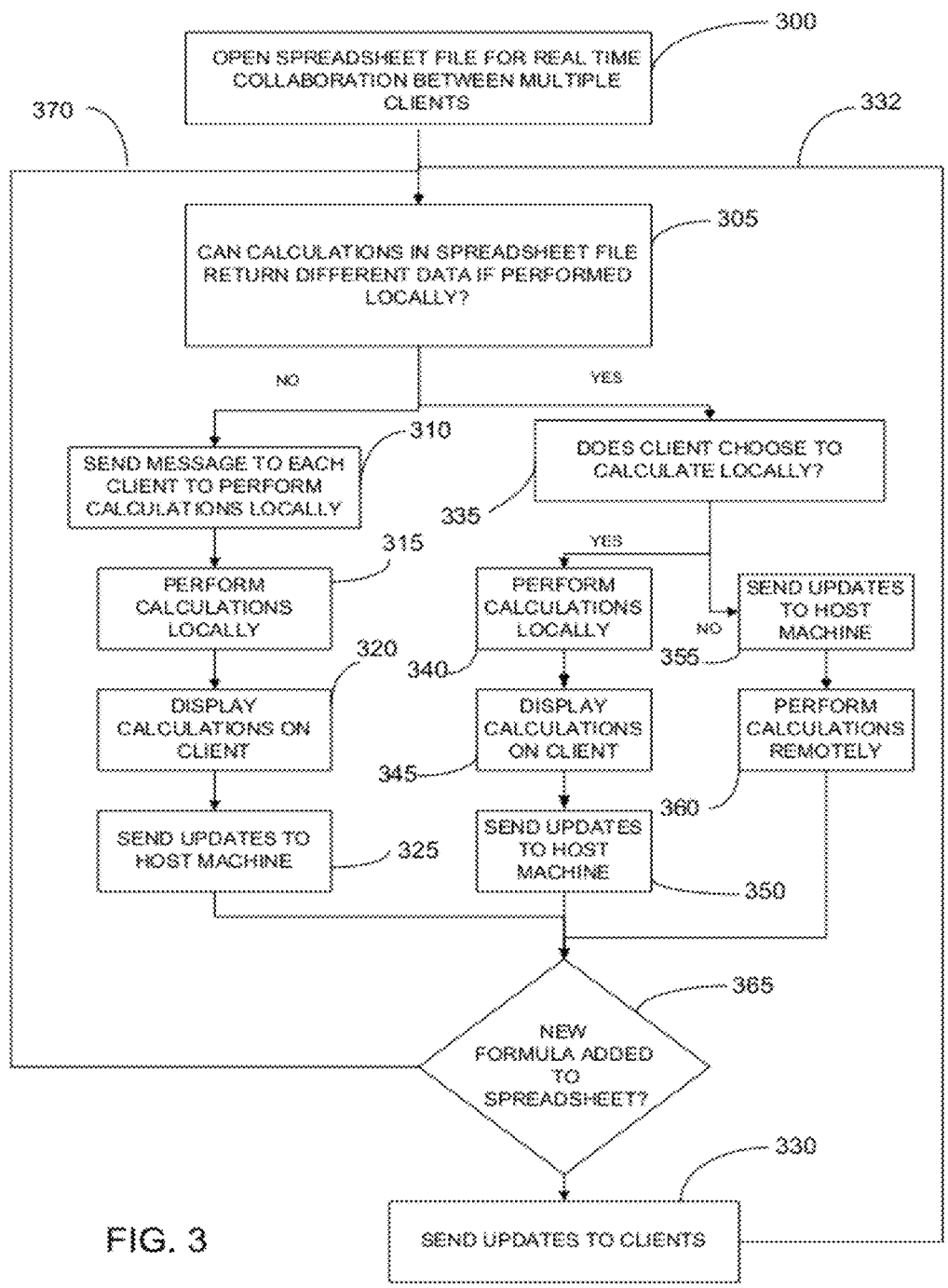
FIG. 3 is a flow diagram of a process for performing calculations in a spreadsheet file for a plurality of client computers collaborating thereon.

In order to better appreciate how local calculations of spreadsheet file 220 are preferably employed during a collaboration session including multiple users or clients, the process steps involved are depicted in FIG. 3. As seen therein, a real time collaboration begins when a spreadsheet file stored on a host machine is opened by multiple clients or users (box 300). Thereafter, the host machine determines whether the calculations to be performed for the spreadsheet file can return different data if performed locally by the clients (box 305). More specifically, the host machine preferably compares all the formulas in the spreadsheet file against a predetermined list of formulas known to generate different results. Discrepancies between calculation results may be caused by various reasons, including when or where the calculations are made. Each spreadsheet implementation may make this determination separately since the determination may depend upon how the functions are evaluated.

If the calculations are determined by the host machine to always return the same results, then a message is sent to each client computer to perform the calculations locally (box 310) and the client computers perform the calculations (box 315). It will be understood that each client computer performing local calculations will then display the results of the calculations in the spreadsheet file at that client (box 320) and send corresponding updates to the host machine (box 325) which includes only data. Consequently, the host machine synchronizes the data updates from the client computers and sends updates to all such client computers (box 330).

Even if it is determined that the calculations could return different data if performed locally by client computers, it is still preferred that each user or client be provided a choice or option whether to calculate formulas in the spreadsheet file locally or not (box 335). There are, for example, situations when local calculations returning different results is acceptable (e.g., when functions give a result that is dependent on which time zone the client computer is located). In such cases, the calculations are performed locally by the client computer (box 340), the calculation results are displayed by the client computer (box 345), and the corresponding data updates are provided to the host machine (box 350).

Should any client be unable to perform the calculations locally or if different results are not considered acceptable, then the data updates are sent to the host machine (box 355) and calculations for the spreadsheet file are preferably performed remotely by the host machine (box 360). The updates are then sent from the host machine to the client computers (box 330). It is also possible that the choice of whether to calculate the formulas in the spreadsheet file locally or not will be predetermined by administrator policy.

Whether calculation of the formulas within the spreadsheet file are performed locally or not, it will be understood from a feedback loop 332 that the data updates synchronized by the host machine and sent to all clients (box 330) are preferably continuous during the collaboration. In this way, the client computers are able to make changes to and perform calculations for the spreadsheet file based on current data.

In order to permit a dynamic determination whether to perform the calculations in the spreadsheet file locally or not, it is preferred that the process include a step to determine whether any new formulas have been added to the spreadsheet file during the collaboration (decision box 365). Clearly, if no formulas have been added by a client computer, the updates from the host machine to the client computers continue to be sent (box 330). When one or more new formulas has been added during the collaboration, it will be appreciated that a feedback loop 370 is created which causes the new formula (s) to be analyzed and a new determination to be made whether the calculations in the spreadsheet file can return different data if performed locally (box 310).

Another aspect of the present invention involves the view of the spreadsheet file displayed at each client computer during the collaboration. Rather than being limited to a shared view of the spreadsheet file, where the client computer displays the entirety thereof, it is sometimes preferred by a client or user to have a private view where only certain objects in the spreadsheet file are shown. It will be appreciated that all the data in the spreadsheet file is the same for each client computer and that changes made to any data are still updated by the host machine and sent to each client computer. Because each client computer is able to apply sorts and filters which only apply to that client's view of the data, each client is able to have their own tailored view of the data in the spreadsheet file. This enables clients that need to simultaneously edit or analyze large tables to have an experience that is similar to that when performing single editing. Of course, it is preferred that changes to views by one client computer are not broadcast to all other clients.

Figure 4:
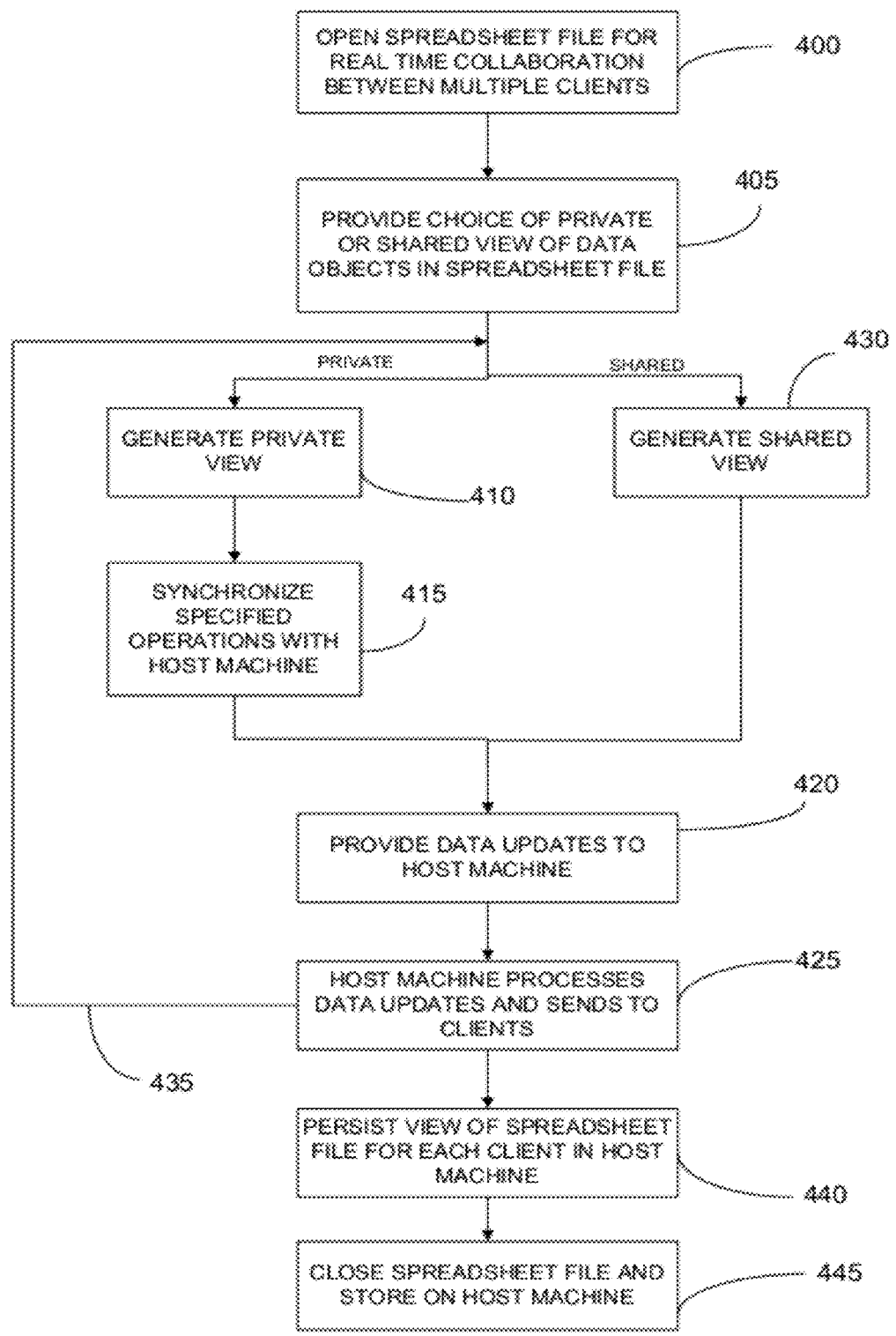
FIG. 4 is a flow diagram of a process for providing views of a spreadsheet file for client computers collaborating on a spreadsheet file.

As seen in FIG. 4, the collaboration is initiated when the spreadsheet file is opened by multiple client computers (box 400). It will be appreciated that a choice or option is provided (such as, for example, by a user interface) which permits a client to select either a private view or a shared view of the data objects in the spreadsheet file (box 405). This option may be global for the entire spreadsheet or it may be per spreadsheet object. If the client desires to have a private view, then that view of the data is generated by the client just as it would in a single user editing case (box 410).

Each time a user or client performs an operation in the collaboration, it determines whether to synchronize this operation with the host machine for the spreadsheet file (box 415). Thus, it is preferred that the client application include logic to know which operations should be synchronized with the host machine and which should not. For example, it may be determined that certain operations (i.e., sorts, filters, PivotTable manipulations, etc.) should not be synchronized. In any event, it is preferred that any data added or changed by the client in the spreadsheet file always be synchronized with the host machine (box 420).

It will be seen that the host machine then processes the data updates and sends them to all client computers (box 425). Any changes that are received by the client computer from the host machine are applied as they normally would be in a collaboration. Therefore, any change in data, even data that is shown in a private view, is then picked up by every other client computer that is in the collaboration. At the same time, the change in data will not be shown in the user interface of a private view unless it is visible in such view. Due to the continuous nature of the editing process during a collaboration, a feedback loop 435 is preferably provided so that the updated data from the host machine is then displayed in the chosen view.

Of course, the other view alternative is a shared view that displays the spreadsheet file in a comprehensive manner. Should a private view not be chosen, a shared view is generated (box 430) instead.

Once a user or client computer decides to exit from the collaboration, it is preferred that the view chosen for such client computer be persisted in the spreadsheet file stored in the host computer (box 440). In this way, the client computers are able to see such view from that spreadsheet file when it is opened at a later date. Optionally, logic may be written for the views of each client computer into the format of the spreadsheet file, which can be represented as a table in the file format which has entries for each user, object, and view of that object.

An exemplary situation could involve a first user and a second user who are collaborating on a large table in a spreadsheet using, for example, a thick client version of a spreadsheet application. The table may contain, for example, sales data for each country. The first user or client may apply a filter so that only sales in the United States are displayed, whereas the second user may employ a filter so that only sales in France are displayed. If the second user makes a change to a row in the table involving a French sale, that change is sent to the first user's computer since the data changed. Nevertheless, the view for the first user does not reflect this change on the screen because all French sales are currently filtered out of that view. Other places in the first user's spreadsheet are correctly updated, however, such as the total sales chart in the first user's spreadsheet where the change made by the second user is taken into account. In addition, the second user may change the filter applied so that sales from both France and Spain are viewed. This change may not be sent to the host machine and may not be picked up by the first user because it only affects the view.

Although the subject matter has been described in language specific to the structural features and/or methodological acts, it is to be understood that the subject matter defined in the appended claims is not necessarily limited to the specific features or acts described above. Rather, the specific features or acts described above are disclosed as example forms of implementing the claims.

What is claimed:

1. A computer-readable storage device having stored thereon computer-executable instructions for performing a process comprising:
   opening a spreadsheet file at a first client, the spreadsheet file also being open at a second client such that both the first client and the second client collaborate on the spreadsheet file;
   providing at the first client a first private view of the spreadsheet file comprising less than the entire spreadsheet file, wherein one or more operations performable by the first client within the spreadsheet file are synchronized with the host machine and one or more other operations performable within the spreadsheet file by the first client are not synchronized with the host machine;
   performing a first operation by the first client within the spreadsheet file;
   determining, by the first client, whether the first operation is one of the one or more operations performable by the first client within the spreadsheet file that are synchronized with the host machine or one of the one or more other operations performable by the first client within the spreadsheet file that are not synchronized with the host machine;
   synchronizing the first operation with the host machine when the first operation is determined to be one of the one or more operations performable by the first client within the spreadsheet file that are synchronized with the host machine; and
   determining not to synchronize the first operation with the host machine when the first operation is determined to be one of the one or more other operations performable by the first client within the spreadsheet file that are not synchronized with the host machine.

2. The computer-readable storage device of claim 1, wherein the first private view of the spreadsheet file is determined by a filter applied to the spreadsheet file.

3. The computer-readable storage device of claim 1, the process performed by the computer-executable instructions further comprising:
   applying all changes in the first client received from a host machine.

4. The computer-readable storage device of claim 1, the process performed by the computer-executable instructions further comprising:
   persisting the first private view of the spreadsheet file in a host machine.

5. The computer-readable storage device of claim 1, the process performed by the computer-executable instructions further comprising:
   writing views for each client into the format of the spreadsheet file; and,
   storing the views in the spreadsheet file on a host machine.

6. A method for spreadsheet collaboration comprising:
opening a spreadsheet file at a first client, the spreadsheet file also being open at a second client such that both the first client and the second client collaborate on the spreadsheet file;
providing at the first client a first private view of the spreadsheet file comprising less than the entire spreadsheet file, wherein one or more operations performable by the first client within the spreadsheet file are synchronized with the host machine and one or more other operations performable within the spreadsheet file by the first client are not synchronized with the host machine;
performing a first operation by the first client within the spreadsheet file;
determining, by the first client, whether the first operation is one of the one or more operations performable by the first client within the spreadsheet file that are synchronized with the host machine or one of the one or more other operations performable by the first client within the spreadsheet file that are not synchronized with the host machine;
synchronizing the first operation with the host machine when the first operation is determined to be one of the one or more operations performable by the first client within the spreadsheet file that are synchronized with the host machine; and
determining not to synchronize the first operation with the host machine when the first operation is determined to be one of the one or more other operations performable by the first client within the spreadsheet file that are not synchronized with the host machine.

7. The method of claim 6, wherein the first private view of the spreadsheet file is determined by a filter applied to the spreadsheet file.

8. The method of claim 6, further comprising:
applying all changes in the first client received from the host machine.

9. The method of claim 6, further comprising:
persisting the first private view of the spreadsheet file in the host machine.

10. The method of claim 6, further comprising:
writing views for each client into the format of the spreadsheet file; and, storing the views in the spreadsheet file on the host machine.

11. A computer system comprising:
one or more processors; and
one or more memories having stored therein instructions that, upon execution by the one or more processors, cause the computer system to perform operations comprising:
opening a spreadsheet file at a first client, the spreadsheet file also being open at a second client such that both the first client and the second client collaborate on the spreadsheet file;
providing at the first client a first private view of the spreadsheet file comprising less than the entire spreadsheet file, wherein one or more operations performable by the first client within the spreadsheet file are synchronized with the host machine and one or more other operations performable within the spreadsheet file by the first client are not synchronized with the host machine;
performing a first operation by the first client within the spreadsheet file;
determining, by the first client, whether the first operation is one of the one or more operations performable by the first client within the spreadsheet file that are synchronized with the host machine or one of the one or more other operations performable by the first client within the spreadsheet file that are not synchronized with the host machine;
synchronizing the first operation with the host machine when the first operation is determined to be one of the one or more operations performable by the first client within the spreadsheet file that are synchronized with the host machine; and
determining not to synchronize the first operation with the host machine when the first operation is determined to be one of the one or more other operations performable by the first client within the spreadsheet file that are not synchronized with the host machine.

12. The computer system of claim 11, wherein the first private view of the spreadsheet file is determined by a filter applied to the spreadsheet file.

13. The computer system of claim 11, wherein the operations further comprise:
applying all changes in the first client received from a host machine.

14. The computer system of claim 11, wherein the operations further comprise:
persisting the first private view of the spreadsheet file in a host machine.

15. The computer system of claim 11, wherein the operations further comprise:
writing views for each client into the format of the spreadsheet file; and,
storing the views in the spreadsheet file on a host machine.

* * * * *